United States Patent [19]
Aoki

[11] Patent Number: 5,085,269
[45] Date of Patent: Feb. 4, 1992

[54] HYDRAULICALLY DRIVEN HEATING AND AIR CONDITIONING SYSTEM FOR VEHICLES SUCH AS MOBILE CRANES

[75] Inventor: Yorikazu Aoki, Maebashi, Japan
[73] Assignee: Sanden Corporation, Gunma, Japan
[21] Appl. No.: 601,354
[22] Filed: Oct. 23, 1990

[30] Foreign Application Priority Data

Oct. 23, 1989 [JP] Japan .............................. 1-123834[U]
Feb. 20, 1990 [JP] Japan .............................. 2-16102[U]

[51] Int. Cl.⁵ .................................................. B60H 1/00
[52] U.S. Cl. ................................... 165/43; 165/42; 165/61; 237/12.3 R; 237/12.3 A; 237/12.3 B; 122/26; 62/323.1; 62/323.4; 62/501; 62/243; 126/247
[58] Field of Search ........................... 165/61, 42, 43; 237/12.3 B, 12.3 R, 12.3 A; 122/26; 126/247; 62/501, 323.1, 323.4, 239, 243

[56] References Cited

U.S. PATENT DOCUMENTS

| | | | |
|---|---|---|---|
| 2,104,696 | 1/1938 | Hanson | 62/501 |
| 2,618,932 | 11/1952 | Taup | 62/501 |
| 2,794,330 | 6/1957 | Dunn | 62/501 |
| 3,983,715 | 10/1976 | Hair, Jr. et al. | 62/323.4 |
| 4,069,972 | 1/1978 | Hausmann | 237/12.3 R |
| 4,172,493 | 10/1979 | Jacobs | 165/42 |
| 4,192,456 | 3/1980 | Shields et al. | 126/247 |
| 4,346,839 | 8/1982 | Moser | 237/12.3 R |
| 4,352,455 | 10/1982 | Moser et al. | 237/12.3 R |
| 4,352,456 | 10/1982 | Brandenburg, Jr. | 237/12.3 R |
| 4,370,956 | 2/1983 | Moser et al. | 237/12.3 R |
| 4,371,112 | 2/1983 | Tholen | 122/26 |
| 4,386,734 | 6/1983 | Weible | 237/12.3 B |
| 4,386,735 | 6/1983 | Tholen et al. | 237/12.3 R |
| 4,407,449 | 10/1983 | Moser et al. | 237/12.3 R |
| 4,420,114 | 12/1983 | Moser et al. | 122/26 |
| 4,432,493 | 2/1984 | Moser et al. | 237/12.3 R |
| 4,434,934 | 3/1984 | Moser et al. | 237/12.3 R |
| 4,487,364 | 12/1984 | Okulicz et al. | 237/12.3 R |
| 4,763,487 | 8/1988 | Wicks | 62/323.1 |
| 4,940,182 | 7/1990 | Heyne | 237/12.3 B |

*Primary Examiner*—John Ford
*Attorney, Agent, or Firm*—Banner, Birch, McKie & Beckett

[57] ABSTRACT

An air conditioning system for vehicles includes a hydraulic circuit having a hydraulic motor and a radiator and a refrigerating circuit having a compressor connected to the hydraulic motor and an evaporator disposed in an air conditioning air duct. The system includes a first pump supplying oil to the hydraulic motor and a second pump supplying the oil to the radiator disposed in the air conditioning air duct. A clutch controls the connection of the hydraulic motor and the compressor. A valve is provided between the second pump and the radiator for generating a pressure difference in the oil between the entrance and exit sides of the valve in order to raise the temperature of the oil. A switching mechanism switches the flow of the oil between a first pathway where the valve is located and a second pathway. The system can operate as a heating system by driving the second pump and passing the oil through the valve; as an air cooling system by driving the compressor and preventing the operation of the valve; and as a dehumidification and heating system by driving the compressor and operating the valve.

16 Claims, 8 Drawing Sheets

FIG. I

HYDRAULICALLY DRIVEN HEATING AND AIR CONDITIONING SYSTEM FOR VEHICLES SUCH AS MOBILE CRANES

BACKGROUND OF THE INVENTION

1. Field of the Invention

The present invention relates to an air conditioning system for vehicles, and more particularly to an air conditioning system suitable for use in a work vehicle having a hydraulic circuit and a refrigerating circuit such as a mobile crane vehicle.

2. Description of the Prior Art

Generally in a work vehicle such as a mobile crane vehicle in which the cabin is rotatable through an angle of 360°, the cooling water for the engine circulating below the cabin cannot be introduced into the cabin. The cooling water cannot be used as a source of heat for the cabin. Heat pump type heating and air conditioning systems are known to be mounted on such vehicles (for example, Japanese Unexamined Patent Publication SHO 61-122462).

This heat pump type system has a hydraulic circuit A and a refrigerating circuit B, as shown in FIG. 11. Hydraulic circuit A comprises a hydraulic pump 11 for pumping up hydraulic oil stored in oil tank 10, hydraulic motor 12 is driven by the oil pumped by hydraulic pump 11. Radiator 13 radiates heat from the oil discharged from hydraulic motor 12. The hydraulic oil flows as shown by the broken line arrows in FIG. 11. The hydraulic oil drives hydraulic motor 12. Relief valve 14 controls the oil pressure introduced into hydraulic motor 12.

Refrigerating circuit B comprises: compressor 20; four-way valve 21; heat exchangers 22, 23 and 24; receiver 25; expansion valve 26; and check valves 27a, 27b, 27c and 27d. Compressor 20 is driven by the rotational force of hydraulic motor 12 provided in hydraulic circuit A. The first heat exchanger 22 is brought into thermal contact with radiator 13 of hydraulic circuit A. The second heat exchanger 23 is disposed in an air conditioning air duct 28 communicating with the inside of the cabin.

When heating is to be performed, a working fluid is circulated in the order of compressor 20, four-way valve 21, second heat exchanger 23, check valve 27a, receiver 25, expansion valve 26, first heat exchanger 22, check valve 27b, four-way valve 21 and compressor 20, as shown by the solid line arrows in FIG. 11. The inside of the cabin is heated by the radiating operation of the second heat exchanger 23.

When air conditioning (air cooling) is performed, the working fluid is circulated in the order of compressor 20, four way valve 21, third heat exchanger 24, check valve 27c, receiver 25, expansion valve 26, check valve 27d, second heat exchanger 23, four-way valve 21 and compressor 20, as shown by the broken line arrows in FIG. 11. The inside of the cabin is cooled by the endothermic operation of the second heat exchanger 23.

In such a conventional air conditioning system, however, although the system can satisfy the operations of air cooling in summer and heating in winter, respectively, the system cannot achieve dehumidification and heating required in, for example, the rainy season. Further, since the conventional air conditioning system is a heat pump type system, many parts are required for assembling the system, and the cost of the system is expensive.

SUMMARY OF THE INVENTION

Accordingly, an objective of the present invention is to provide an air conditioning system which can operate for heating and air cooling without using a heat pump type system, and further can operate as a dehumidifying and heating system, suitable for use in work vehicles.

To achieve this object, an air conditioning system according to the present invention is herein described. The air conditioning system includes a hydraulic circuit having a hydraulic motor and a radiator radiating the heat of a hydraulic oil, and a refrigerating circuit having a compressor connected to the hydraulic motor and an evaporator disposed in an air conditioning air duct. The air conditioning system comprises a first hydraulic pump provided in the hydraulic circuit for supplying the hydraulic oil to the hydraulic motor and a second hydraulic pump provided in the hydraulic circuit for supplying the hydraulic oil to the radiator. The radiator is disposed in the air conditioning duct. The system further comprises a first clutch mechanism provided between the hydraulic motor and the compressor for controlling the connection of the hydraulic motor and the compressor. A first fluid pathway is defined between the radiator and the second hydraulic pump and a second fluid pathway extends in parallel to said first fluid pathway. A valve means is provided in the first fluid pathway for generating a pressure difference in the hydraulic oil between the entrance and exit sides of the valve means. A first switching means is provided in the hydraulic circuit for switching the flow of hydraulic oil between the first pathway where the valve means is located and the second pathway.

In an air conditioning system formed in accordance with the present invention, when heating is to be performed, the connection of the hydraulic motor and the compressor is disconnected by the first clutch mechanism. The hydraulic oil is caused to flow in the first pathway, where the valve means is located, by switching the first switching means. The hydraulic oil is heated by the friction force in the path due to the resistance of the valve means. The heat of the heated oil is radiated by the radiator disposed in the air conditioning air duct, and heated air for heating is generated.

When air cooling is performed, the compressor is connected to the hydraulic motor by the first clutch mechanism, and the flow of the hydraulic oil to the valve means is regulated. The hydraulic oil is not substantially heated. The compressor is driven, the refrigerant or working fluid is circulated in the refrigerating circuit, and cooling air for air conditioning is generated by the endothermic operation of the evaporator.

When dehumidification and heating are performed, the compressor is connected to the hydraulic motor by the first clutch mechanism, and the hydraulic oil flows in the first pathway, where the valve means is located, by switching the first switching means. The hydraulic oil is heated in the same manner as in the above heating operation, and heated air for heating is generated. At the same time, the refrigerant is circulated in the refrigerating circuit, and cooling air is generated by the endothermic operation of the evaporator. The cooling air is dehumidified by the evaporator. The dehumidified conditioned air for heating is generated by mixing the heated air and the dehumidified air in the air duct.

Thus, the system can operate for heating and air cooling without using a heat pump type air conditioning system. Therefore, the air conditioning system can be simplified, and the cost of the system can be reduced. Further, the system can operate for dehumidification and heating suitable for use during the rainy season or the like. As a result, an air conditioning system for work vehicles which can be used in all seasons is obtained.

BRIEF DESCRIPTION OF THE DRAWINGS

Some preferred exemplary embodiments of the invention will now be described with reference to the accompanying drawings, which are given by way of example only, and are not intended to limit the present invention.

DETAILED DESCRIPTION OF PREFERRED EMBODIMENTS OF THE INVENTION

Figure 1:
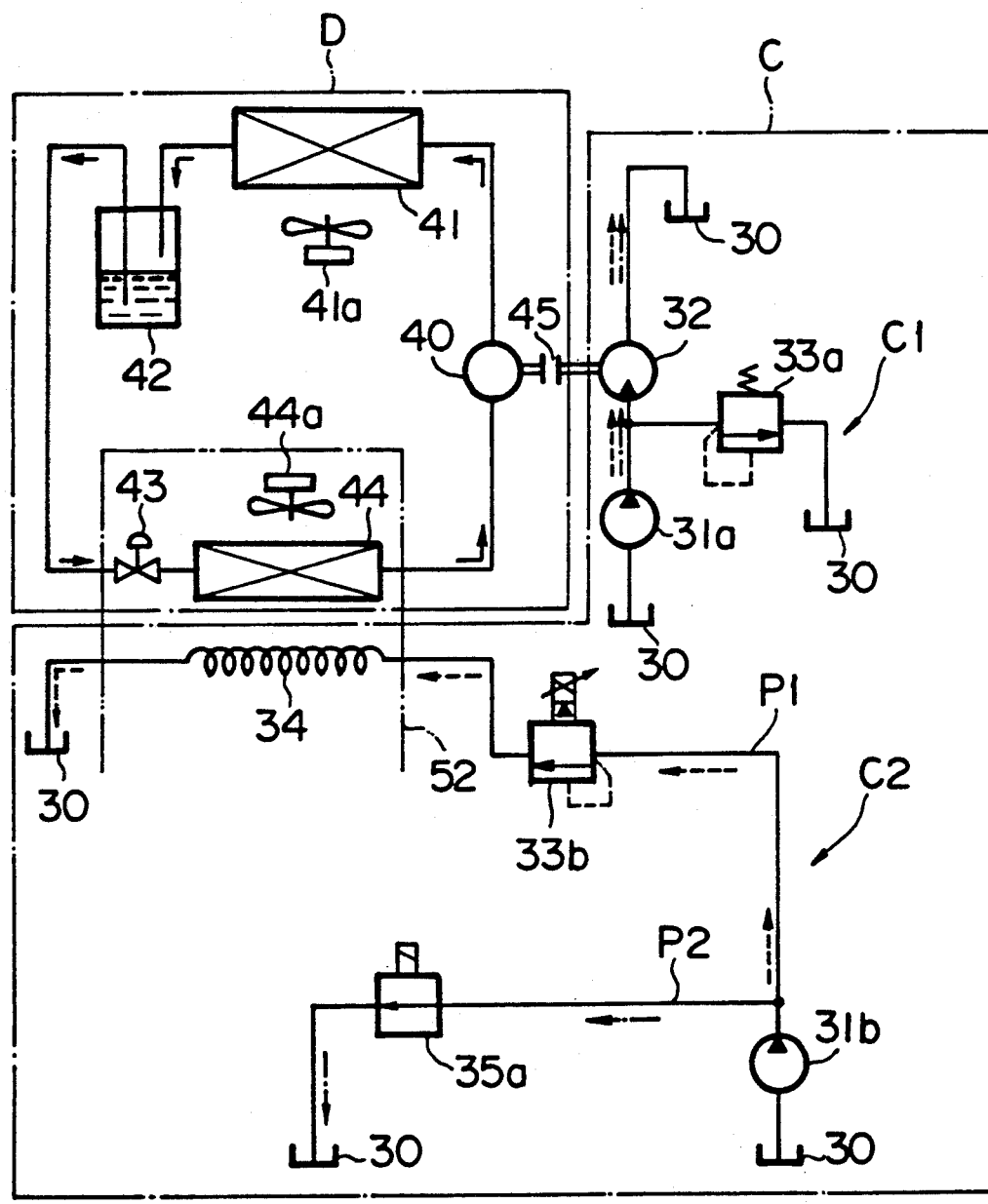
FIG. 1 is a circuit diagram of an air conditioning system according to a first embodiment of the present invention.

Referring to the drawings, FIG. 1 illustrates a circuit of an air conditioning system according to a first embodiment of the present invention. The circuit includes a hydraulic circuit C and a refrigerating circuit D. The hydraulic circuit C comprises a hydraulic motor driving circuit C1 and a radiation circuit C2.

Hydraulic motor driving circuit C1 comprises an oil tank 30, a first hydraulic pump 31a, a first relief valve 33a and a hydraulic motor 32. The hydraulic pump 31a pumps up the hydraulic oil stored in oil tank 30. The hydraulic motor 32 is driven by the hydraulic oil sent from hydraulic pump 31a. The relief valve 33a controls the oil pressure introduced into hydraulic motor 32.

Radiation circuit C2 comprises oil tank 30, a second hydraulic pump 31b, a second relief valve 33b which is a proportional solenoid valve, a radiator 34 and a solenoid valve 35a of the normally open type. The first and second hydraulic pumps 31a and 31b are driven by an engine of a vehicle on which the system is mounted. The second relief valve 33b functions as a valve means according to the present invention, which generates a pressure difference in the hydraulic oil between the entrance and exit sides of the valve means. The solenoid valve 35a functions as a first switching means according to the present invention, which is provided in the hydraulic circuit C for switching the flow of the hydraulic oil between a first pathway P1 where the proportional solenoid valve means 33b is located and a second pathway P2 where the proportional solenoid valve means 33b is not located. When solenoid valve 35a opens, the hydraulic oil pumped up by second hydraulic pump 31b is returned directly to oil tank 30. When solenoid valve 35a is closed, the hydraulic oil pumped up by second hydraulic pump 31b flows into radiator 34 through second relief valve 33b.

Second relief valve 33b can generates a pressure difference in the hydraulic oil between the entrance and exit sides of the second relief valve. The pressure difference can be set at a target value which is freely determined by the vehicle operator. The heating value generated by this pressure difference is expressed by the following equation.

$$H = 1.41 \times Q \times \Delta P$$

where,
  H: heating value (kcal/h)
  Q: flow rate of hydraulic oil (l/min)
  $\Delta P$: pressure difference (kgf/cm$^2$)
  1.41: constant Accordingly, the heat radiated from radiator 34 is in proportion to the pressure difference due to second relief valve 33b.

Refrigerating circuit D comprises a compressor 40, a condenser 41, a receiver 42, an expansion valve 43 and an evaporator 44 disposed in series. The condenser 41 and the evaporator 44 are heat exchanged with the air forcibly sent by fans 41a and 44a, respectively. Compressor 40 is connected to hydraulic motor 32 via a first clutch mechanism 45 provided for controlling the connection of the compressor 40 and the hydraulic motor 32.

Figure 2:
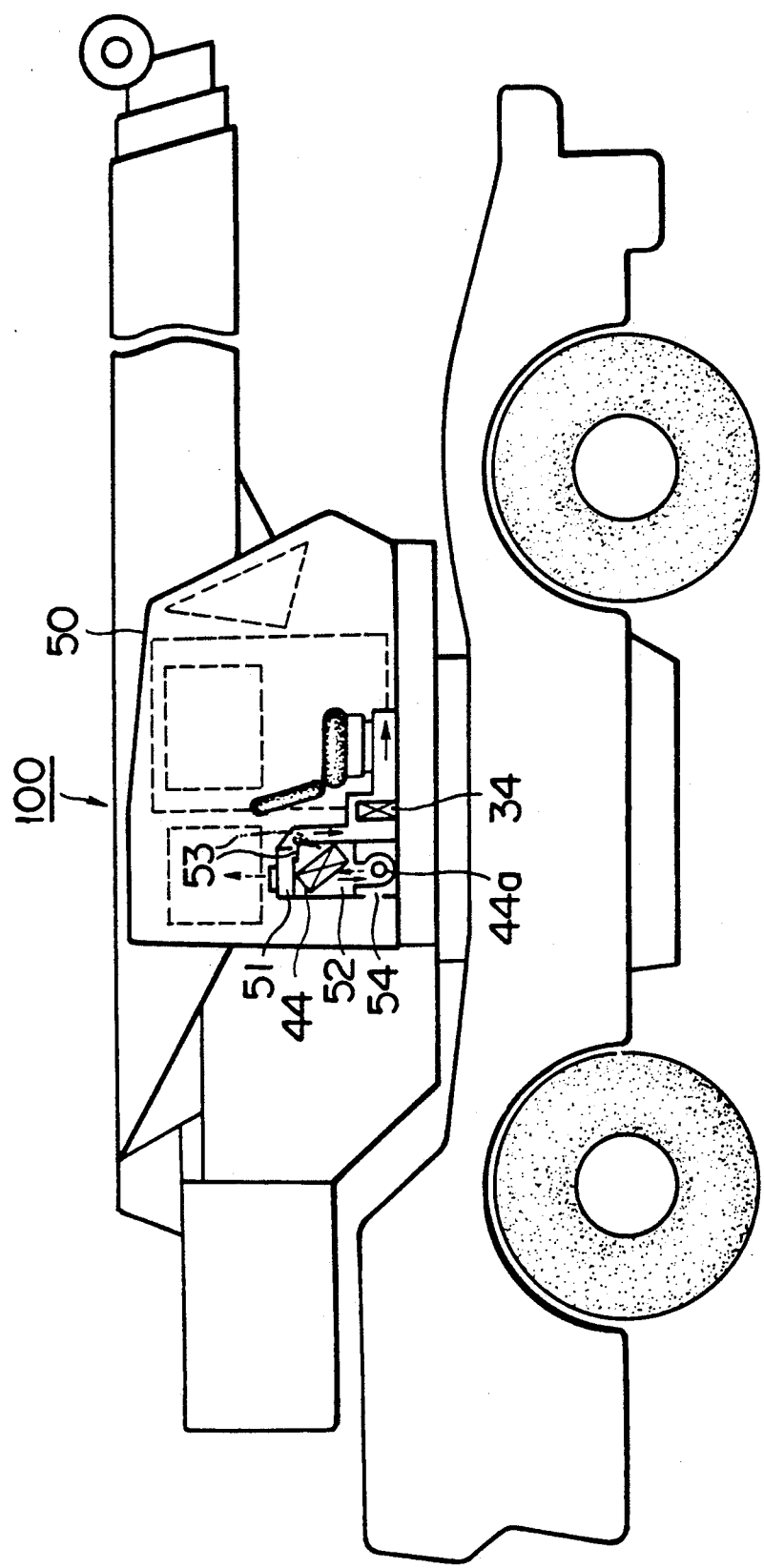
FIG. 2 is a schematic side view of a mobile crane vehicle having therein the air conditioning system shown in FIG. 1.

FIG. 2 illustrates a schematic state where the above air conditioning system is mounted on a mobile crane vehicle 100. An air conditioning unit 51 is placed in a cabin 50 of the vehicle 100. Fan 44a, evaporator 44 and radiator 34 are installed in an air conditioning air duct 52 provided in cabin 50. A damper 53 is provided in the air conditioning air duct 52 for switching the air path in the air duct between an air path for heating and an air path for air cooling. When heating or dehumidification and heating are performed, the air in cabin 50 is sucked through a suction opening 54 and the air is discharged into the cabin 50 through evaporator 44 and radiator 34, as shown by the solid line arrows in FIG. 2. When air cooling is performed, the air is discharged into the cabin 50 only through evaporator 44, as shown by the broken line arrows in FIG. 2.

In the above embodiment, when heating is performed in winter, clutch mechanism 45 disconnects hydraulic motor 32 and compressor 40, solenoid valve 35a is closed, and fan 44a is driven. Although the hydraulic oil flows in hydraulic circuit C1 as shown by the broken line arrows in FIG. 1 and hydraulic motor 32 is driven, compressor 40 is not actuated. The hydraulic oil pumped up by second hydraulic pump 31b circulates in the order of second relief valve 33b, radiator 34 and oil tank 30, as shown by the broken line arrows in FIG. 1. When the hydraulic oil passes through the second relief valve 33b, a pressure difference is generated between the entrance and exit sides of the second relief valve 33b, so that the hydraulic oil is heated. The heat of the hydraulic oil is radiated by radiator 34, and the air in air conditioning air duct 52 which is sent by fan 44a is heated by the radiation. Thus, cabin 50 is heated.

When air conditioning (air cooling) is performed in summer, hydraulic motor 32 and compressor 40 are connected by clutch mechanism 45, solenoid valve 35a is opened, and fans 41a and 44a are driven. The hydraulic oil pumped up by first hydraulic pump 31a circulates through hydraulic motor 32 as shown by the arrows of dashed line in FIG. 1, and hydraulic motor 32 is driven. Compressor 40 is driven by hydraulic motor 32, and the refrigerant discharged by compressor 40 circulates in the order of condenser 41, receiver 42, expansion valve 43, evaporator 44 and the compressor 40, as shown by the solid line arrows in FIG. 1. The air in air conditioning air duct 52 which is sent by fan 44a is cooled at evaporator 44. Thus, the air in cabin 50 is cooled. In radiation circuit C2, the hydraulic oil pumped up by second hydraulic pump 31b is returned to oil tank 30 through solenoid valve 35a.

When dehumidification and heating are performed, hydraulic motor 32 and compressor 40 are connected by clutch mechanism 45, solenoid valve 35a is closed, and fans 41a and 44a are driven. The hydraulic oil pumped by second hydraulic pump 31b is circulated in the same manner as the heating operation as shown by the broken line arrows in FIG. 1, and the air in air conditioning air duct 52 is heated. The refrigerant discharged by compressor 40 circulates in the same way as in air cooling operation as shown by the solid line arrows in FIG. 1, and the air in air conditioning air duct 52 is cooled. At the same time, the air in air conditioning air duct 52 is dehumidified by the cooling at evaporator 44. The heating by radiator 34 and the dehumidification and cooling by evaporator 44 thus perform the dehumidification and heating of cabin 50.

Since second relief valve 33b is a proportional solenoid valve and the pressure difference caused by the second relief valve can be freely and easily controlled, the temperatures of heating and dehumidification and heating can be easily set to desired temperatures by changing the pressure difference.

Figure 3:
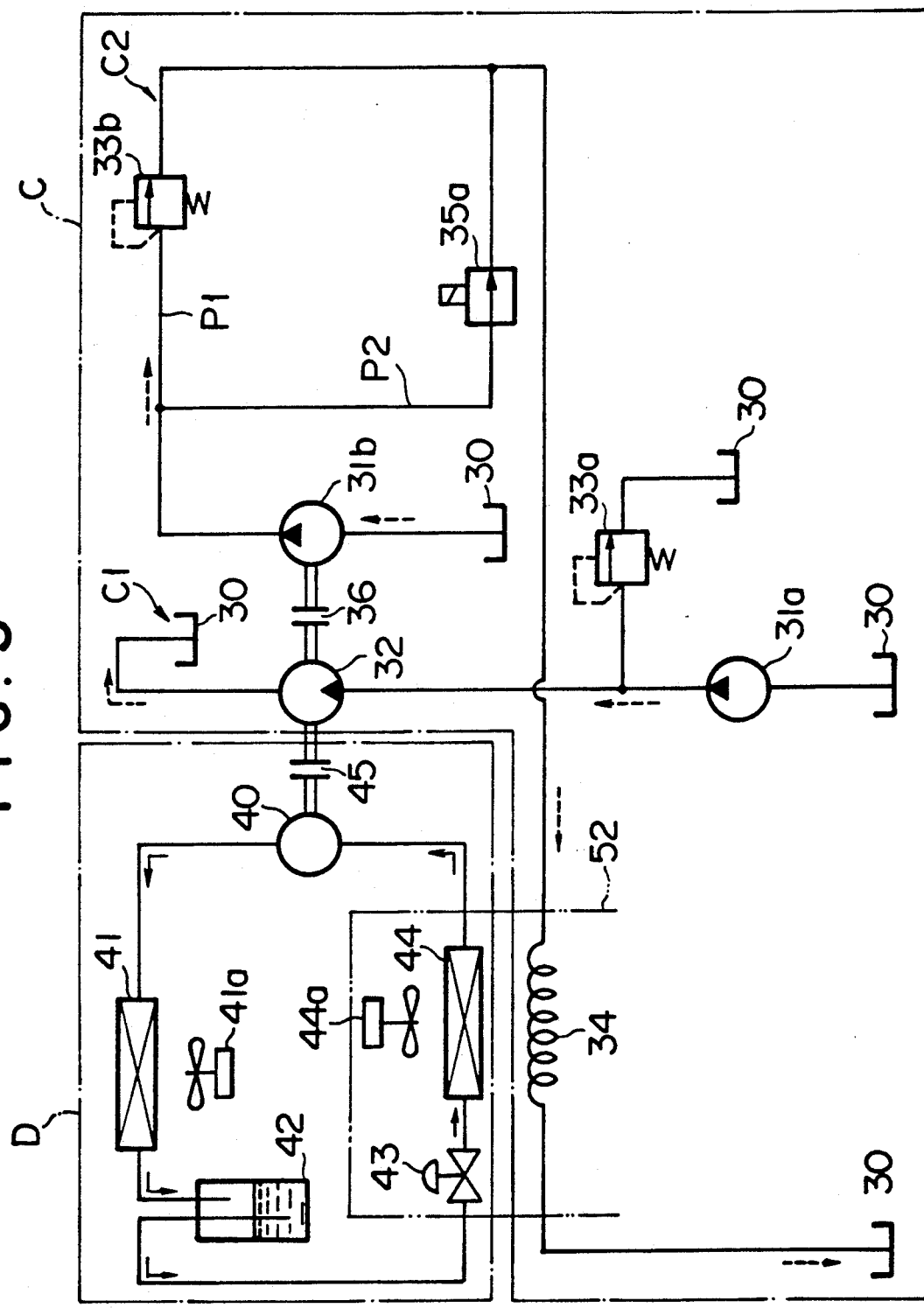
FIG. 3 is a circuit diagram of an air conditioning system according to a second embodiment of the present invention.

FIG. 3 illustrates a circuit of an air conditioning system according to a second embodiment of the present invention. In FIG. 3, the parts having substantially the same functions as those of the parts in the first embodiment are labeled using the same reference numerals as in FIG. 1. In this embodiment, a second clutch mechanism 36 is provided between hydraulic motor 32 and second hydraulic pump 31b. The second hydraulic pump 31b is driven by the hydraulic motor 32 when the second clutch mechanism 36 connects them. A second relief valve 33b constitutes a valve means for causing a pressure difference in the hydraulic oil. Solenoid valve 35a constitutes a first switching means. The second relief valve 33b and the solenoid valve 35a are disposed in parallel to each other between second hydraulic pump 31b and radiator 34. In the embodiment, when heating is performed, first clutch mechanism 45 disconnects hydraulic motor 32 and compressor 40. Hydraulic motor 32 and second hydraulic pump 31b are connected via second clutch mechanism 36. Solenoid valve 35a is closed, and fan 44a is driven. Although the hydraulic oil flows in hydraulic circuit C1 as shown by the broken line arrows in FIG. 3 and hydraulic motor 32 is driven, compressor 40 is not actuated. The second hydraulic pump 31b is driven by hydraulic motor 32 via the connection of second clutch mechanism 36. The hydraulic oil pumped up by second hydraulic pump 31b circulates in the order of second relief valve 33b, radiator 34 and oil tank 30, as shown by the broken line arrows in FIG. 3. When the hydraulic oil passes through second relief valve 33b, a pressure difference is generated between the entrance and exit sides of second relief valve 33b, and the hydraulic oil is heated. The heat of the hydraulic oil is radiated by radiator 34, and the air in air conditioning air duct 52 which is circulated by fan 44a is heated by the radiation. Thus, cabin 50 (FIG. 2) is heated.

In the above, if solenoid valve 35a is opened, the hydraulic oil does not pass through second relief valve 33b. However, a pressure loss in the hydraulic path generates, and the heat caused by the pressure loss is radiated by radiator 34.

When air conditioning (air cooling) is performed in summer, hydraulic motor 32 and compressor 40 are connected by first clutch mechanism 45. Second clutch mechanism 36 disconnects the connection of hydraulic motor 32 and second hydraulic pump 31b, and fans 41a and 44a are driven. The hydraulic oil pumped up by first hydraulic pump 31a circulates through hydraulic motor 32 as shown by the broken line arrows in FIG. 3, and the hydraulic motor 32 is driven. Compressor 40 is driven by hydraulic motor 32, and the refrigerant discharged by the compressor 40 circulates in the order of condenser 41, receiver 42, expansion valve 43, evaporator 44 and the compressor 40, as shown by the solid line arrows in FIG. 3. The air in air conditioning air duct 52 which is circulated by fan 44a is cooled at evaporator 44. Thus, the air in cabin 50 is cooled.

When dehumidification and heating are performed, hydraulic motor 32 and compressor 40 are connected by first clutch mechanism 45, and hydraulic motor 32 and second hydraulic pump 31b are connected by second clutch mechanism 36. Solenoid valve 35a is closed, and fans 41a and 44a are driven. The hydraulic oil pumped up by second hydraulic pump 31b is circulated in the same way as in heating operation as shown by the broken line arrows in FIG. 3, and the air in air conditioning air duct 52 is heated. The refrigerant discharged by the compressor 40 circulates in the same way as in air cooling operation as shown by the solid line arrows in FIG. 3, and the air in air conditioning air duct 52 is dehumidified and cooled. Thus, the dehumidification and heating in cabin 50 are performed by the heating caused by radiator 34 and the dehumidification and cooling caused by evaporator 44.

Figure 4:
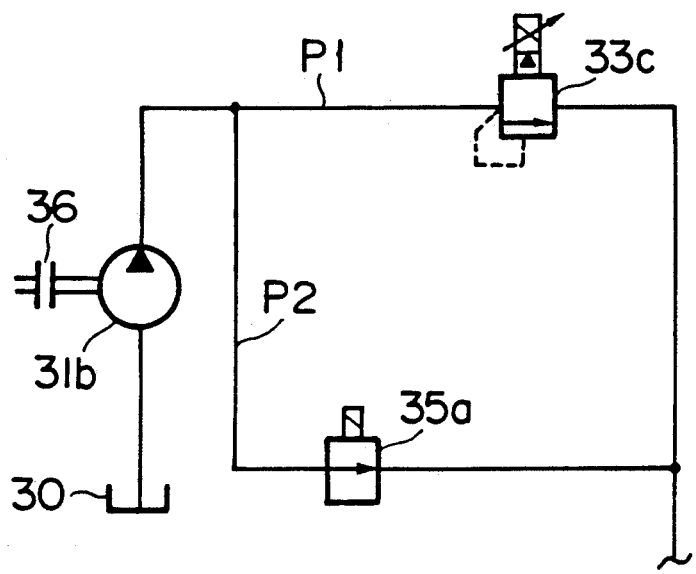
FIG. 4 is a partial circuit diagram of an air conditioning system according to a third embodiment of the present invention.

FIG. 4 illustrates a part of the hydraulic circuit of an air conditioning system according to a third embodiment of the present invention. In this embodiment, a variable relief valve 33c, which can control the pressure difference of the hydraulic oil, is used instead of second relief valve 33b in the above-mentioned hydraulic circuit of the second embodiment. In this embodiment, the heat radiated from radiator 34 can be changed by changing the pressure difference of the hydraulic oil caused by variable relief valve 33c. Other parts of this circuit and the operation are substantially the same as the second embodiment.

Figure 5:
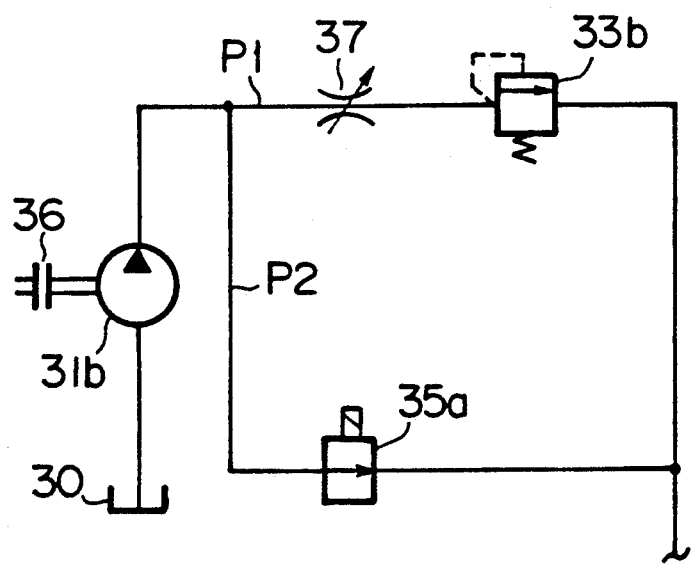
FIG. 5 is a partial circuit diagram of an air conditioning system according to a fourth embodiment of the present invention.

FIG. 5 illustrates a part of the hydraulic circuit of an air conditioning system according to a fourth embodiment of the present invention. In this embodiment, a variable flow metering valve 37, which can control the flow of the hydraulic oil, is inserted between second relief valve 33b and second hydraulic motor 31b in the hydraulic circuit of the second embodiment. In this embodiment, the flow of the hydraulic oil passing through second relief valve 33b is controlled by variable flow metering valve 37, and the heat generated by the second relief valve 33b is controlled by controlling of the flow of hydraulic oil. Other parts of this circuit and the operation are substantially the same as the second embodiment.

Figure 6:
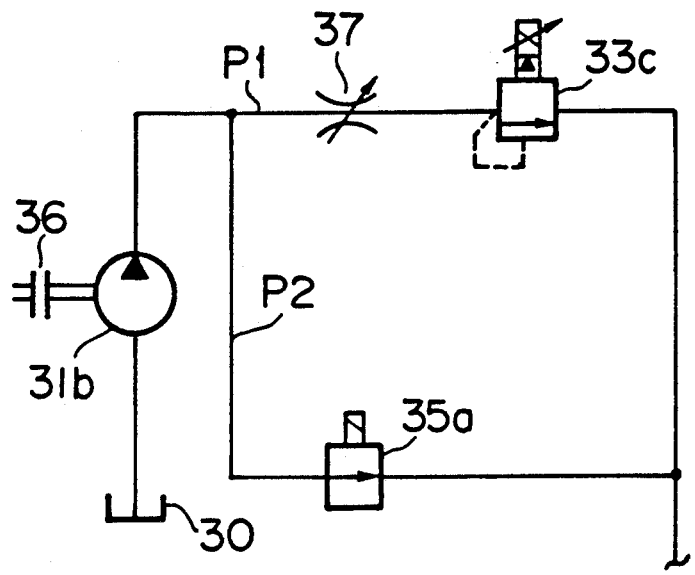
FIG. 6 is a partial circuit diagram of an air conditioning system according to a fifth embodiment of the present invention.

FIG. 6 illustrates a part of the hydraulic circuit of an air conditioning system according to a fifth embodiment of the present invention. In this embodiment, variable flow metering valve 37 is inserted between variable relief valve 33c and second hydraulic motor 31b in the hydraulic circuit of the aforementioned third embodiment. In this embodiment, the flow of the hydraulic oil is controlled by variable flow metering valve 37, and the pressure difference of the hydraulic oil is controlled by variable relief valve 33c. The heat caused by the pressure difference at variable relief valve 33c can be broadly controlled by controlling both of the flow and pressure of the hydraulic oil. The construction and operations of the remaining parts are substantially the same as the second embodiment.

Figure 7:
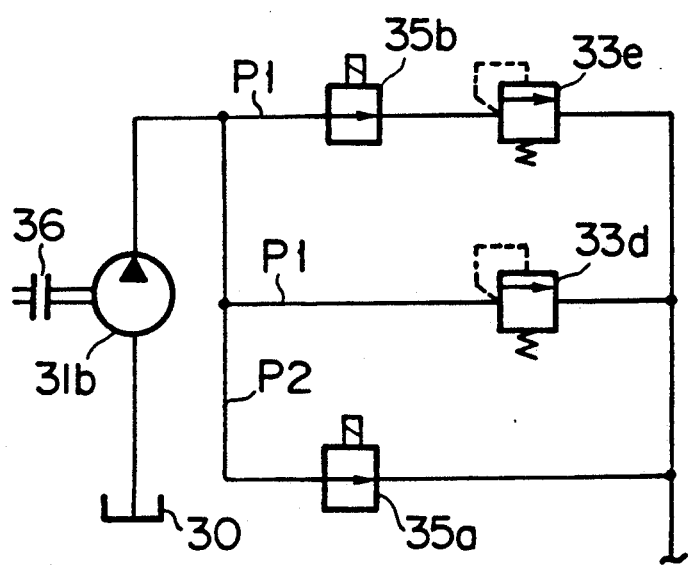
FIG. 7 is a partial circuit diagram of an air conditioning system according to a sixth embodiment of the present invention.

FIG. 7 illustrates a part of the hydraulic circuit of an air conditioning system according to a sixth embodiment of the present invention. In this embodiment, two relief valves 33d and 33d are inserted in parallel between second hydraulic motor 31b and radiator 34 in the hydraulic circuit of the second embodiment. The preset pressures of the relief valves 33d and 33e are different from each other, and the pressure set in relief valve 33d is higher than the pressure set in relief valve 33e. A solenoid valve 35b is provided as a second switching means at a position of the entrance side of relief valve 33e for selectively sending the hydraulic oil to each of the relief valves 33d and 33e. When the solenoid valve 35b is opened, the hydraulic oil passes through relief valve 33e preset with a relatively lower pressure. When the solenoid valve 35b is closed, the hydraulic oil passes through relief valve 33d preset with a relatively higher pressure. In this embodiment, the pressure difference of the hydraulic oil is controlled by opening and closing solenoid valve 35b. The heat radiated by radiator 34 can be controlled by controlling of the pressure difference. Other parts of this circuit and the operation are substantially the same as the second embodiment.

Figure 8:
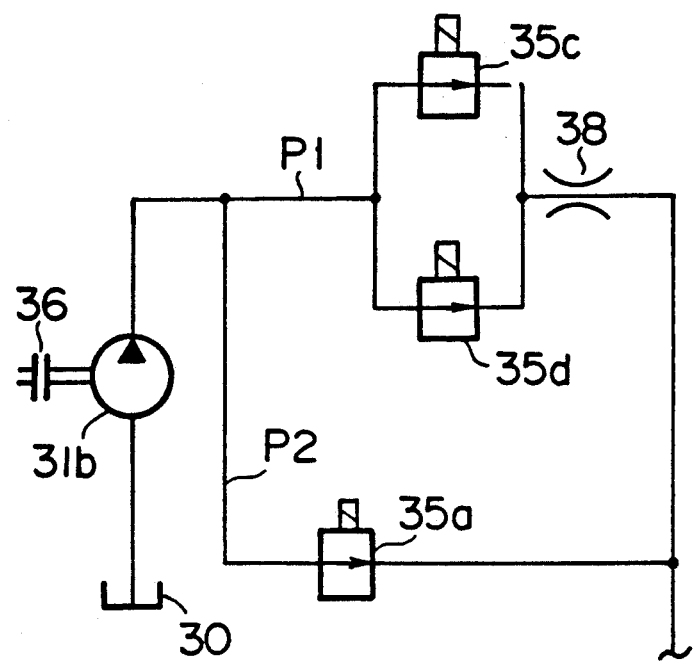
FIG. 8 is a partial circuit diagram of an air conditioning system according to a seventh embodiment of the present invention.

FIG. 8 illustrates a part of the hydraulic circuit of an air conditioning system according to a seventh embodiment of the present invention. In this embodiment, a exothermic orifice 38, which can generate a pressure difference in the hydraulic oil between the entrance and exit sides of the orifice is provided, instead of relief valve 33b. Further, solenoid valves 35c and 35d having respective flow rates different from each other constitute a flow control means for controlling the flow of hydraulic oil to exothermic orifice 38. Solenoid valves 35c and 35d are provided at the entrance side of the orifice 38 in parallel to each other. In this embodiment, the flow of hydraulic oil passing through exothermic orifice 38 is controlled by opening and closing solenoid valves 35c and 35d having respective flow rates different from each other. The heat generated by exothermic orifice 38 and the heat radiated from radiator 34 are controlled by the control of the flow of hydraulic oil. Other parts of this circuit and the operation are substantially the same as the second embodiment.

Figure 9:
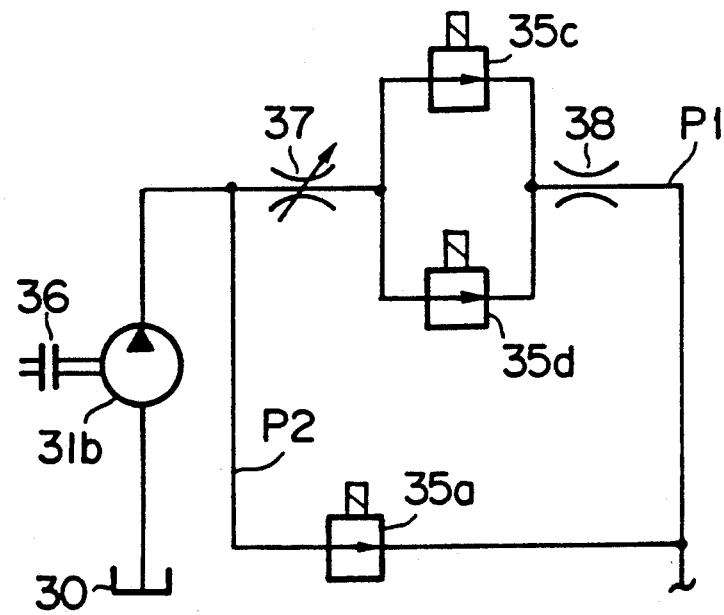
FIG. 9 is a partial circuit diagram of an air conditioning system according to an eighth embodiment of the present invention.
Figure 10:
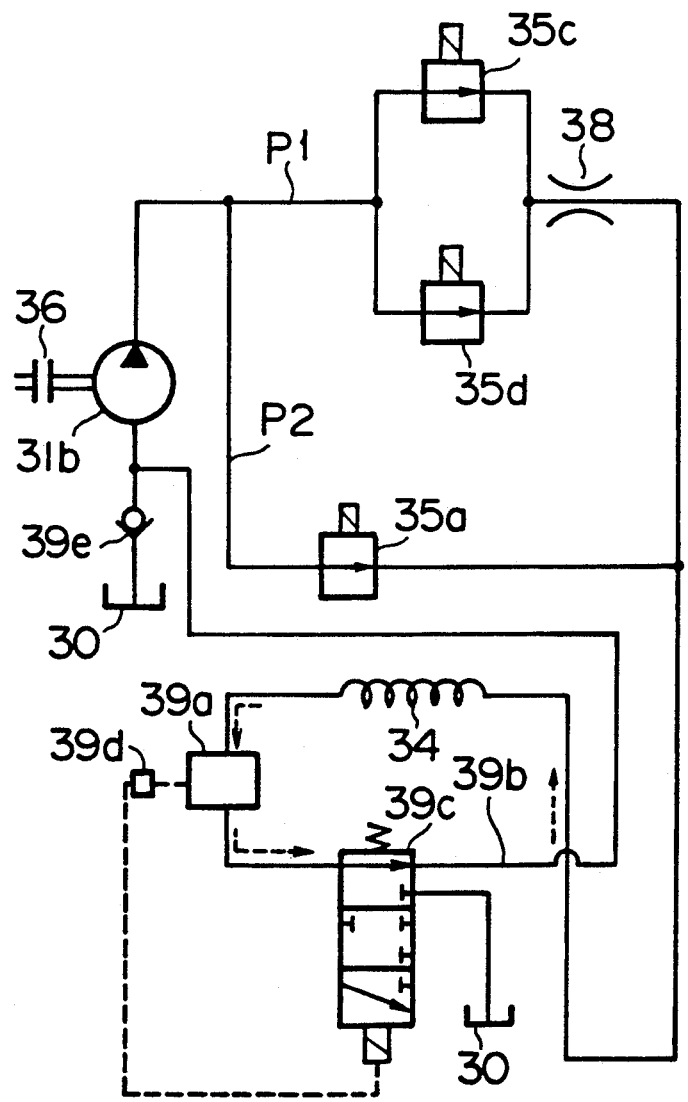
FIG. 10 is a partial circuit diagram of an air conditioning system according to a ninth embodiment of the present invention.
Figure 11:
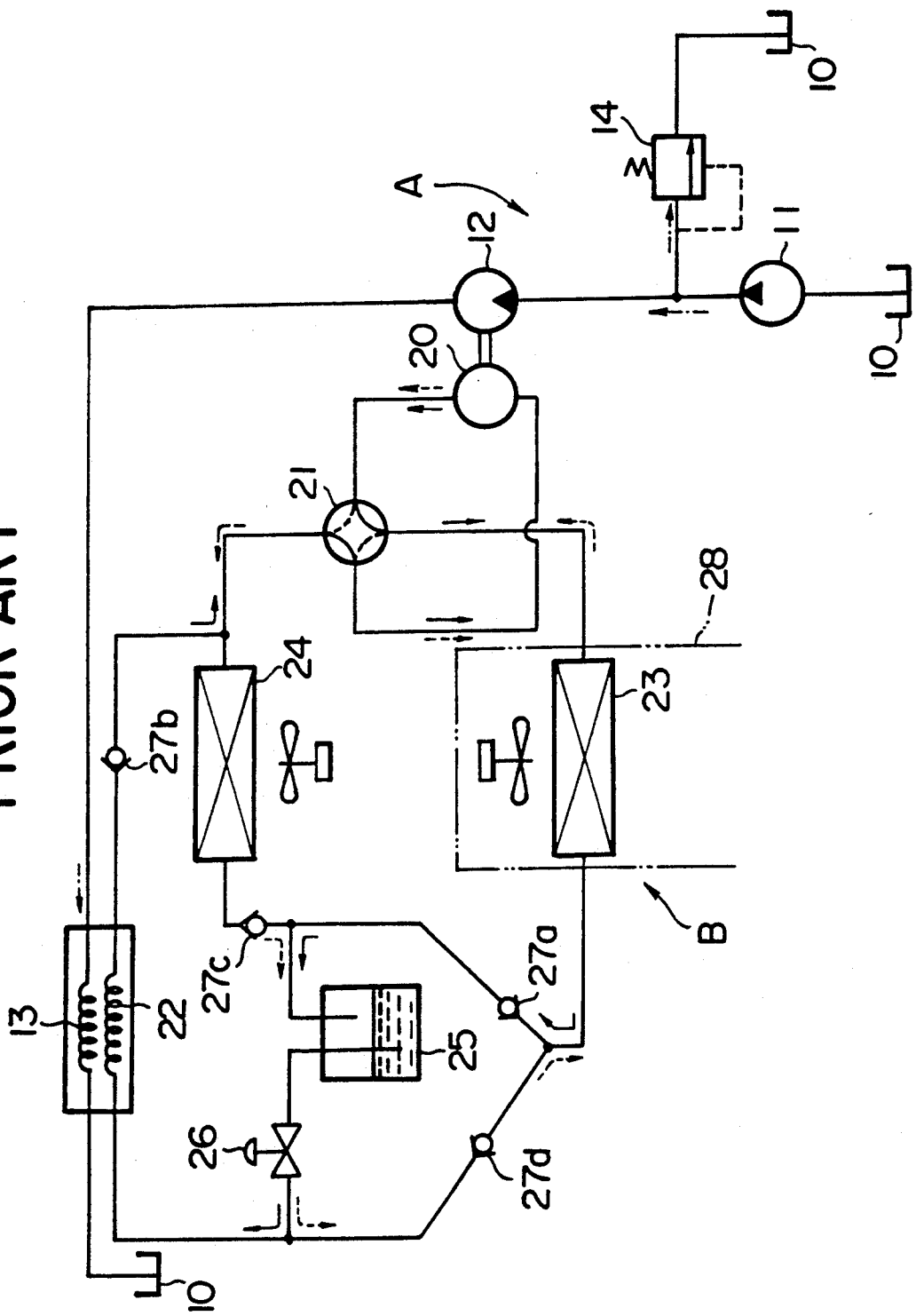
FIG. 11 is a circuit diagram of a conventional air conditioning system.

FIG. 9 illustrates a part of the hydraulic circuit of an air conditioning system according to an eighth embodiment of the present invention. In this embodiment, variable flow metering valve 37 is inserted between solenoid valves 35c and 35d and second hydraulic motor 31b in the hydraulic circuit of the above-mentioned seventh embodiment. In this embodiment, the flow of hydraulic oil to exothermic orifice 38 is controlled by controlling variable flow metering valve 37 and/or solenoid valves 35c and 35d, and the heat caused by exothermic orifice 38 can be more broadly controlled. Other parts of this circuit and the operation are substantially the same as the second embodiment. FIG. 10 illustrates a part of the hydraulic circuit of an air conditioning system according to a ninth embodiment of the present invention. In this embodiment, a sub tank 39a is disposed between the discharge side of radiator 34 and oil tank 30 in radiation circuit C2 of hydraulic circuit C of the second embodiment. A bypass fluid pathway (bypass conduit) 39b communicates between the sub tank 39a and the suction side of second hydraulic pump 31b. A two way solenoid valve 39c is provided as a third switching means between sub tank 39a and oil tank 30 for selectively returning the oil to the suction side of second hydraulic pump 31b or oil tank 30. A thermostat 39d is provided on sub tank 39a for detecting the temperature of the oil in sub tank 39a and sending the operating signals to two way solenoid valve 39c in accordance with the detected temperature. If the temperature of the hydraulic oil detected by thermostat 39d does not reach a predetermined temperature (a temperature suitable for heating or dehumidification heating, for example, 80° C.), the hydraulic oil is returned from sub tank 39a to the suction side of second hydraulic pump 31b through bypass path 39b. When the temperature of the hydraulic oil reaches the predetermined temperature or is over the predetermined temperature, the hydraulic oil is returned from sub tank 39a to oil tank 30. A check valve 39e prevents the hydraulic oil from reversely flowing into oil tank 30.

In this embodiment, the hydraulic oil is heated by the pressure difference caused by exothermic orifice 38 when the oil passes through exothermic orifice 38. When the temperature of the hydraulic oil sent to sub tank 39a does not reach a predetermined temperature, the temperature of the oil is detected by thermostat 39d, two way solenoid valve 39c is operatively switched to the position communicating with bypass path 39b, and the oil is returned to the suction side of second hydraulic pump 31b through bypass fluid pathway 39b. Therefore, the hydraulic oil circulates in the hydraulic circuit C2 without returning to oil tank 30. As a result, the temperature of the hydraulic oil is raised to a desired temperature in a short period of time, and a desired heating or dehumidification and heating state can be completed in a short period of time. After the temperature of the hydraulic oil reaches the predetermined temperature, two way solenoid valve 39c is operatively switched to return the oil to oil tank 30. Other parts and the operation of this circuit are substantially the same as the second embodiment.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of the invention as defined by the following claims.

I claim:

1. An air conditioning system for vehicles including a hydraulic circuit having a hydraulic motor and a radiator radiating the heat of a hydraulic oil, and a refrigerating circuit having a compressor connected to said hydraulic motor and an evaporator disposed in an air conditioning air duct, said air conditioning system comprising:
   a first hydraulic pump provided in said hydraulic circuit for supplying said hydraulic oil to said hydraulic motor and a second hydraulic pump provided in said hydraulic circuit for supplying said hydraulic oil to said radiator, said radiator being disposed in said air conditioning air duct;
   a first clutch mechanism provided between said hydraulic motor and said compressor for controlling the connection of said hydraulic motor and said compressor;
   a first fluid pathway defined between said radiator and said second hydraulic pump and a second fluid pathway extending in parallel to said first fluid pathway;
   a valve means provided in said first fluid pathway for generating a pressure difference in said hydraulic oil between the entrance and exit sides of said valve means; and
   a first switching means provided in said hydraulic circuit for switching the flow of said hydraulic oil between said first pathway where said valve means is located and said second pathway.

2. An air conditioning system according to claim 1 wherein said second hydraulic pump is connected to said hydraulic motor, and further comprising a second clutch mechanism provided between said hydraulic motor and said second hydraulic pump for controlling the connection of said hydraulic motor and said second hydraulic pump.

3. The air conditioning system according to claim 1 or 2 wherein said valve means is a relief valve.

4. The air conditioning system according to claim 1 or 2 wherein said valve means is a variable relief valve.

5. The air conditioning system according to claim 1 or 2 wherein a variable flow metering valve is provided in said first pathway.

6. An air conditioning system according to claim 1 or 2 wherein said valve means comprises a plurality of relief valves which have different relief pressures and said plurality of relief valves are arranged in parallel to one another between said second hydraulic pump and said radiator, and further comprising a second switching means provided in said hydraulic circuit for selectively sending said hydraulic oil to each of said plurality of relief valves.

7. The air conditioning system according to claim 1 or 2 wherein said valve means comprises an exothermic orifice generating a pressure difference in said hydraulic oil between the entrance and exit sides of said exothermic orifice, and a flow control means comprising a plurality of valves having different respective flow rates for controlling the flow of said hydraulic oil to said exothermic orifice by selectively opening or closing each of said plurality of valves.

8. An air conditioning system according to claim 7 further comprising a variable flow metering valve provided in said first pathway, for controlling the flow of said hydraulic oil to said plurality of valves.

9. An air conditioning system according to claim 1 or 2 further comprising a bypass fluid pathway, which communicates between the discharge side of said radiator and the suction side of said second hydraulic pump, and a third switching means for controlling the communication between the discharge side of said radiator and the suction side of said second hydraulic pump, said third switching means switching said bypass fluid pathway to the state where said hydraulic oil from said radiator is returned to the suction side of said second hydraulic pump when the temperature of said hydraulic oil is below a predetermined temperature.

10. The air conditioning system according to claim 1 or 2 wherein a relief valve is provided between said first hydraulic pump and said hydraulic motor for controlling the pressure of said hydraulic oil sent to said hydraulic motor.

11. The air conditioning system according to claim 1 or 2 wherein said first switching means comprises a solenoid valve.

12. The air conditioning system according to claim 1 wherein said first switching means communicates directly with an oil tank.

13. The air conditioning system according to claim 2 wherein said first switching means is provided on a fluid pathway bypassing said valve means.

14. The air conditioning system according to claim 1 or 2 wherein said air conditioning system is mounted on a work vehicle.

15. The air conditioning system according to claim 1 or 2 wherein said work vehicle is a mobile crane vehicle.

16. The air conditioning system according to claim 14 wherein a damper is provided in said air conditioning air duct mounted on said working vehicle, said damper switching an air path in said air conditioning air duct between a path for heating and a path for air cooling.

* * * * *